United States Patent [19]

Doty

[11] 4,439,010
[45] Mar. 27, 1984

[54] APPARATUS FOR COMBINING OPTICAL IMAGES

[75] Inventor: James L. Doty, Laguna Niguel, Calif.

[73] Assignee: Spectron Development Laboratories, Inc., Costa Mesa, Calif.

[21] Appl. No.: 364,317

[22] Filed: Apr. 1, 1982

[51] Int. Cl.³ .............................................. G02B 27/10
[52] U.S. Cl. ...................................... 350/174; 350/512
[58] Field of Search ................. 350/174, 512; 356/390

[56] References Cited

U.S. PATENT DOCUMENTS

| | | | |
|---|---|---|---|
| 1,864,895 | 6/1932 | Egy | 350/512 |
| 2,040,066 | 5/1936 | Ursinus | 350/512 |
| 3,218,908 | 11/1965 | Armington | 350/174 |

Primary Examiner—John K. Corbin
Assistant Examiner—Lynn Vandenburgh
Attorney, Agent, or Firm—Jeffrey J. Blatt

[57] ABSTRACT

An apparatus for combining optical images which is particularly suited for use in integrated circuit lead wire gang bonding systems is disclosed. The apparatus includes an objective lens to gather and focus light rays reflected from an object, such as a microelectronic device. A beamsplitter provides first and second images of the object which are inverted with respect to one another. The images are directed onto mirrowed prism surfaces, such that only selected portions of the first and second images actually strike each prism face. That portion of each image which does strike the respective prism face is reflected upward and combined to form one resulting image. Viewing means are provided to view the resultant image.

8 Claims, 5 Drawing Figures

APPARATUS FOR COMBINING OPTICAL IMAGES

BACKGROUND OF THE INVENTION

1. Field of the Invention

The present invention relates to the field of optical microscopes, and more particularly to optical microscopes used in the fabrication and packaging of semiconductor devices.

2. Art Background

After the fabrication of an integrated circuit "chip", lead wires are bonded from the integrated circuit package which encapsulates the chip to conductive elements ("pads") on the circuit itself. Frequently, wire bonding is achieved by optically lining up the numerous pads on the periphery of the circuit chip with the lead wires, and then effectuating the actual bonding using techniques well known in the art. Various optical systems have been developed over the years to provide the bonding operator with a simultaneous image of the pads and leads. For example, in one system commonly used a video camera is coupled to a microscope thereby providing an image of the circuit with its associated conductive pads on a cathode ray tube (CRT) display. The operator, using the CRT image as a guide, lines up the leads with the conductive pads, and then completes the bonding process.

However, with the advent of very large scale integration (VLSI) technology, the size of the chip and the number of pads on a VLSI microelectronic device is significantly greater than previously found in the art. For example, it is anticipated that in the near future, integrated circuits with 200 to 300 pads and associated leads will be commonplace. Presently, wire lead bonding systems typically bond 1 mil leads to 4 mil-square pads, on 8 mil centers (See J. Lyman, "Packaging VLSI", *Electronics,* Dec. 29, 1981, Page 66). For VLSI chips larger than approximately 1/5 inch, with 2 mil pads on 4 mil (or smaller) centers, present video display systems are unable to adequately resolve each pad while displaying the entire chip, which is necessary in order to permit lead bonding. Accordingly, there exists a need for an optical display system which will permit the bonding of VLSI circuits, and which will permit standard video and CRT display systems to be used to align the conductive pads with the lead wires.

As will be disclosed below, the present invention provides a means whereby selected portions of an integrated circuit may be displayed to permit alignment of lead wires for bonding. As will be appreciated from the discussion which follows, the present invention is particularly suited for use with integrated circuits incorporating very large scale integration technology, although it may be used in numerous applications where only selected portions of one or more objects are to be viewed.

SUMMARY OF THE INVENTION

A microscope having particular application for use in integrated circuit lead wire bonding systems is disclosed. An objective lens gathers and focuses light reflected from an integrated circuit chip or other object. A beamsplitter disposed along the light path of the objective lens provides first and second identical images of the entire circuit. A prism having mirrored faces oriented substantially at 90 degrees to one another is provided, and appropriate light guiding elements are used to direct the first image onto one face of the prism and the second image onto the other prism face. The images are oriented such that they are inverted with respect to one another. Positioning means are provided to move the prism along an axis passing longitudinally through its apex, such that only selected portions of the first and second images actually strike each prism face. That portion of each image which does strike the respective prism face is reflected upward and combined to form one resulting image. Viewing means, such as for example a video camera, are positioned at the image plane of the prism such that the resulting combined image is displayed on a CRT or other display device. Thus, opposing corners of an integrated circuit chip may be simultaneously displayed at a magnification higher than would be otherwise possible if the entire chip were viewed, thereby allowing the operator to align the appropriate wire leads for bonding with a corresponding higher resolution of the individual pads. By properly positioning the prism, only those conductive pads which are necessary to align the circuit chip with the lead wires are displayed.

DETAILED DESCRIPTION OF THE INVENTION

A microscope having particular application for use in integrated circuit lead wire bonding systems is disclosed. In the following description for purposes of explanation, specific numbers, reflectivity and transmissivity values, materials and configurations are set forth in order to provide a thorough understanding of the present invention. However, it will be apparent to one skilled in the art that the present invention may be practiced without these specific details. In other instances, well known optical elements and systems are shown in diagrammatical form in order not to obscure the present invention unnecessarily.

Figure 1:
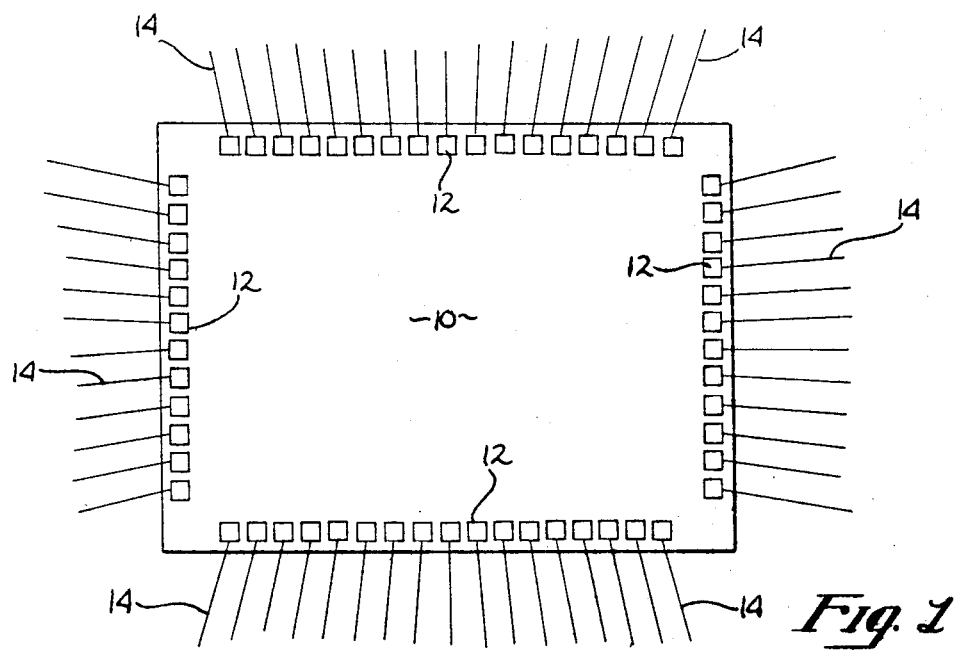
FIG. 1 is a diagrammatical representation of bonding pads and associated bonding wires on a very large scale integration (VLSI) semiconductor chip.

Referring now to FIG. 1, an integrated circuit chip 10, formed using techniques well known in the art, includes a multiplicity of conductive pads 12 along its periphery. The specific number of conductive pads on the circuit 10 will vary in accordance with the particular application for which the circuit is to be used. For example, in circuits incorporating VLSI technology, the number of conductive pads 12 may fall within the range of 85 to 300 pads per circuit. The pads are electrically connected to various electronic elements (not shown) which comprise the integrated circuit 10. Lead wires 14 are gang bonded onto the pads 12 to couple the integrated circuit 10 to various other circuit elements on a printed circuit board or the like.

As previously discussed, typically an operator viewing the integrated circuit 10 using a video camera in conjunction with a microscope, aligns the pads 12 with the lead wires 14 and effectuates bonding. However, in the case of chips fabricated using VLSI technology, the CRT rastor scan display has insufficient resolution to resolve each conductive pad 12 when displaying the entire chip.

Figure 2:
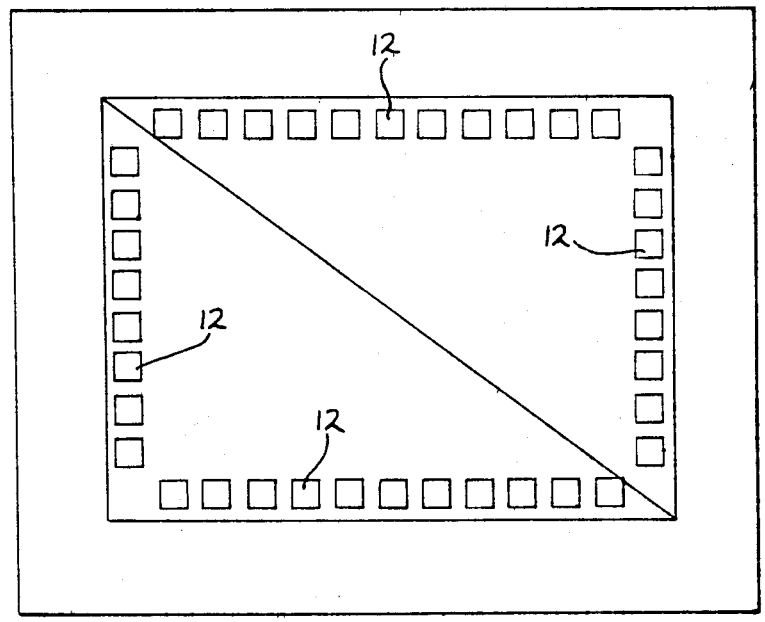
FIG. 2 is an illustration of the combined image of opposing corners of the VLSI integrated circuit of FIG. 1, as provided by the present invention.

It has been found that it is not required that all pads 12 on an integrated circuit be displayed in order to effectuate lead bonding. Rather, proper lead bonding on all pads may be achieved if selected portions of the integrated circuit 10 are displayed and aligned with the respective lead wires 14 to be bonded. In the presently preferred embodiment, selected portions of opposing corners of the integrated circuit 10, with its associated pads 12 are displayed. It will be appreciated from the discussion which follows, that the present invention permits any portion of the integrated circuit to be displayed on the CRT as may be required in a particular application. Thus, as illustrated in FIG. 2, the present invention provides a combined image of opposing corners of the VLSI integrated circuit 10 of FIG. 1 (note that the drawings are not to scale and that the number of pads which are disposed on integrated circuit 10 in FIG. 1 may be in actuality significantly greater than shown). As will be discussed, the present invention permits the display of any number of pads 12 which may be required by the particular lead bonding system used. In addition, by incorporating a zoom objective lens, the magnification of the integrated circuit 10 or other object can be readily varied. Typically, 8 to 10 pads on each edge of the opposing corners of the chip are displayed when bonding a state of the art VLSI integrated circuit.

Figure 3:
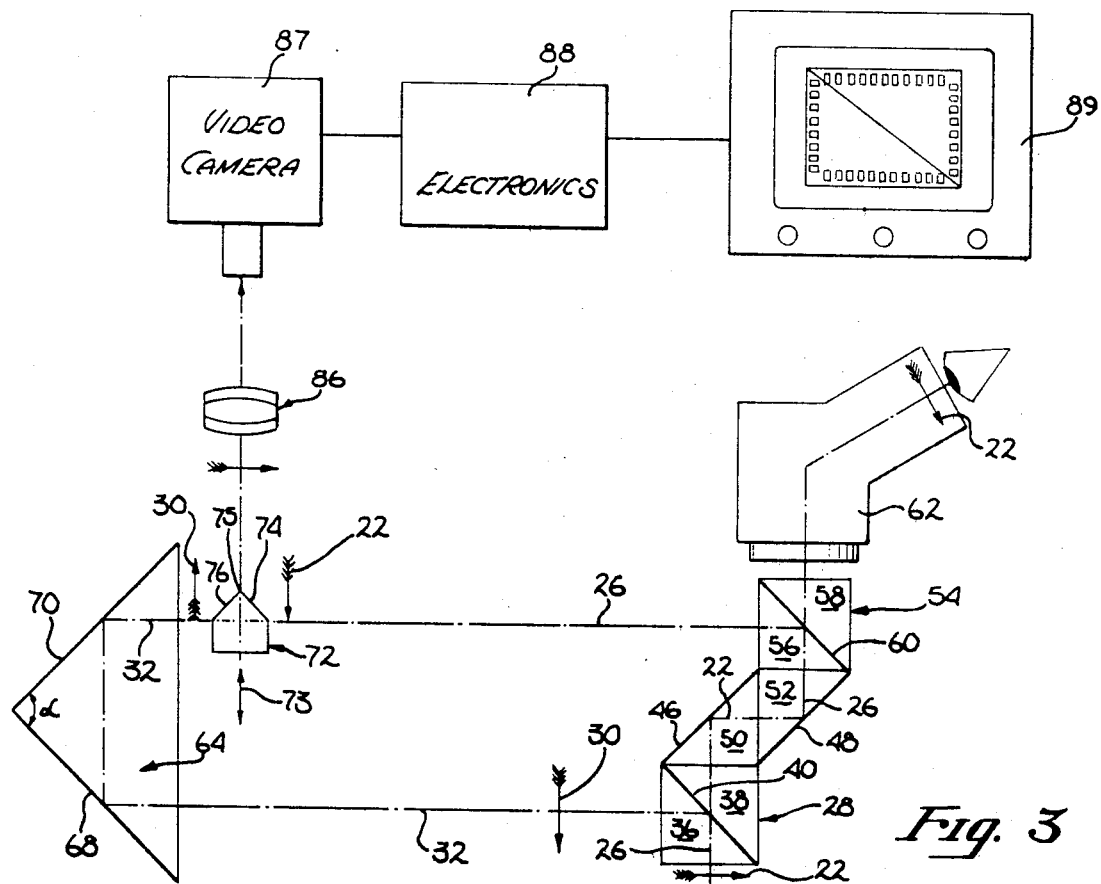
FIG. 3 illustrates the optical layout of the present invention in order to combine selected portions of an object image.

Referring now to FIG. 3, the present invention will be described in detail. An object 16, such as integrated circuit 10, is placed for viewing below an objective lens 18. Objective lens 18 may comprise a standard fixed magnification lens, or as in the present preferred embodiment, one of variable (zoom) magnification. Light rays 20 reflected (or generated) from the integrated circuit 10 or other object are gathered and focused by the objective lens 18, forming a primary object image 22 along light path 26.

A beamsplitter 28 is disposed along light path 26 and provides a secondary image 30 of the object 16 along light path 32. As illustrated, beamsplitter 28 is formed in the presently preferred embodiment by coupling two prisms 36 and 38 together at interface surface 40 using optical cement. A partially reflecting beamsplitter coating is disposed on interface 40 such that approximately 33 percent of the light comprising the primary object image 22 is reflected along light path 32, thereby forming the secondary object image 30. Similarly, approximately 67 percent of the incident light along light path 26 is transmitted through interface surface 40, and is reflected by mirrored surfaces 46 and 48 of prisms 50 and 52, as illustrated. In the presently preferred embodiment, the mirrored surfaces are formed by depositing an aluminized coating on the exterior of the respective prism surfaces. It will be apparent to one skilled in the art, that prisms 50 and 52 are provided to assure that the length of the light paths traversed by the primary and secondary object images are equal in order to obtain the correct focal length for the system.

A second beamsplitter 54 is disposed along light path 26 to provide the system user with an optional means to view the primary image 22 of the object 16 if desired. In practice, beamsplitter 54 is comprised of prisms 56 and 58 coupled along interface surface 60. A beam splitter coating is applied to surface 60 such that 50 percent transmittance and reflectance is acheived. Appropriate viewing means, such as eyepiece mount 62, is provided to allow the user to view the primary image 22. In the event that the particular optical system does not require that the user observe the primary object image 22, then surface 60 may be aluminized such that virtually all incident light is reflected along light path 26. It will be appreciated that if surface 60 is rendered fully reflective, that in order to assure equal light intensity at the system output, the beamsplitter coating at interface 40 would be provided such that 50 percent of the incident light is transmitted along the light path 26 and 50 percent is reflected along light path 32.

A retroreflector 64 is disposed along light path 32 with aluminized mirrored surfaces 68 and 70. Surfaces 68 and 70 are provided such that the angle alpha with respect to each surface substantially equals 90 degrees. As illustrated, the secondary object image 30 passes into prism 64 and is reflected off of mirrored surface 68 onto surface 70. Thus, it will be appreciated that after being reflected off of surface 70 the secondary image 30 is inverted with respect to the primary object image 22. In addition, all optics utilized by the present invention are provided such that light path 26 after being reflected by beamsplitter interface 60 is substantially coincident and aligned with light path 32 exiting the retroreflector 64. Thus, although inverted, the primary and secondary object images substantially overlap one another.

A combining prism 72 is provided with mirrored surfaces 74 and 76 oriented substantially 90 degrees to one another. Prism 72 is disposed along the aligned light paths 26 and 32, such that the primary and secondary object images can strike each respective mirrored surface at generally a 45 degree angle. In addition, prism 72 is moveable longitudinally along an axis 73 passing through its apex 75 to allow only selective portions of each object image to strike surfaces 74 and 76, as will be described.

Figure 4:
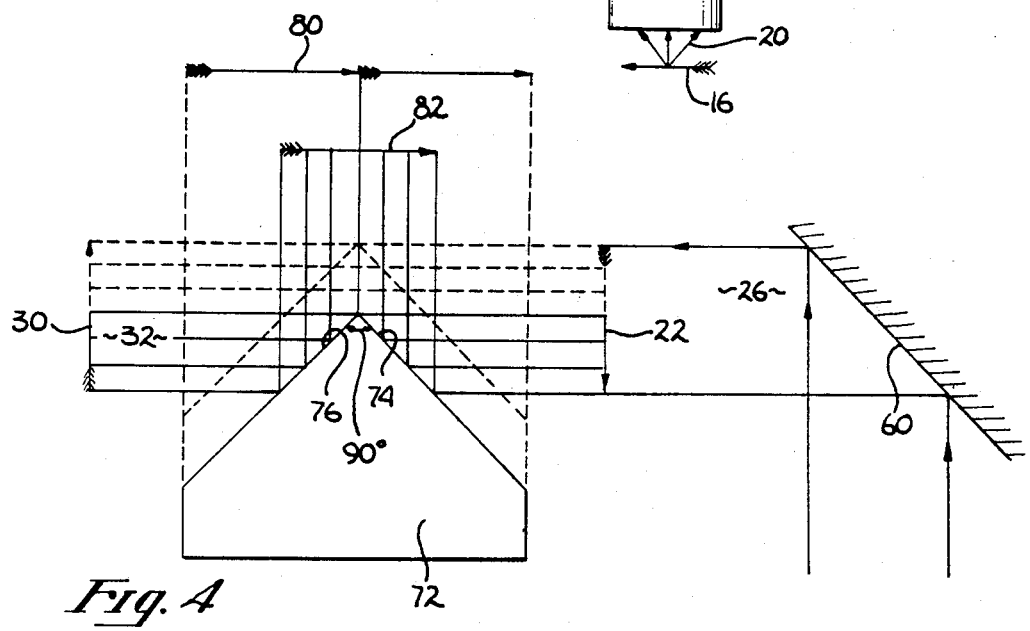
FIG. 4 illustrates the operation of the combining prism utilized by the present invention in order to selectively combine portions of one or more object images.

Referring now to FIG. 4, the action of prism 72 to selectively combine the primary and secondary images will be disclosed. As previously described, the primary object image 22 is reflected by the beam splitter interface 60 along light path 26. Similarly, secondary object image 30 is reflected by retroreflector 64 along light path 32, such that light paths 32 and 26 are substantially coincident. Suppose for sake of example that combining prism 72 is positioned (as shown in phantom lines) such that the entire primary object image 22 strikes the reflecting surface 74. Similarly, since both light paths are in substantial alignment, the entire secondary object image 30 will strike the reflecting surface 76 of prism 72. Thus, both object images will be reflected upward and form resulting image 80. Since both images were fully reflected, resultant image 80 will comprise both images 22 and 30, as shown in FIG. 4.

Assume now for sake of example that combining prism 72 is positioned such that only a portion of object images 22 and 30 strike the respective reflecting surfaces. As illustrated in FIG. 4, that portion of each image not striking the prism (shown in phantom lines) is lost and not reflected. However, that portion of each image which does strike the reflecting surfaces is reflected upward and combined to form resultant image 82. Therefore, it will be appreciated that by selectively positioning prism 72 along light paths 26 and 32, desired portions of each object image may be combined. The resultant image 82 is focused by lens 86 and viewed at the image plane by video camera 87, as illustrated in FIG. 3. The resultant image is then processed through associated electronics 88 and displayed on CRT 89 or the like, as may be required in any particular application.

It will be appreciated that by positioning combining prism 72 along axis 73, that a user may selectively combine and display various images of the same or even different objects. In operation, an operator of a lead bonding system adjusts the position of the combining prism 72 and the magnification of the objective lens 18 such that only those conductive pads 12 which must be aligned with the respective leads are displayed. Once aligned, the bonding of all leads to the chip is effectuated using techniques common in the art.

Figure 5:
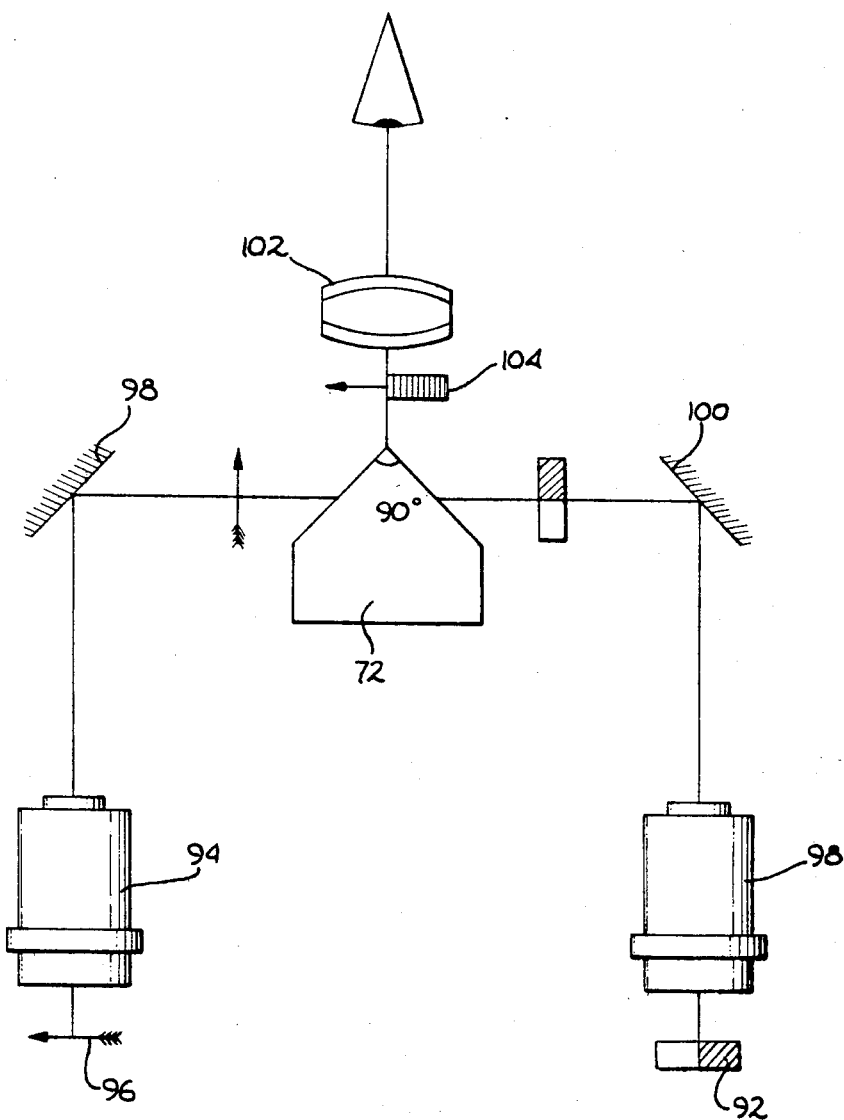
FIG. 5 illustrates an alternate embodiment of the present invention for combining images of more than one object.

Referring now to FIG. 5, an alternate embodiment of the present invention is disclosed for combining images of more than one object. Objective lens 90 is disposed above a first object 92 and gathers and focuses light rays reflected from or generated by the object 92. Similarly, objective lens 94 is situated above a second object 96. Mirrors 98 and 100 are provided to reflect the images of each object, as illustrated, and to project each object image onto the mirrored surfaces of combining prism 72. As previously discussed, by selectively positioning prism 72 across the light paths of the object images, a user may combine the images of objects 92 and 96 as desired. Viewing means such as eyepiece 102 or the like may be provided to view the resultant image 104 reflected onto the horizontal plane from the combining prism's surfaces.

It will be apparent that the various prisms illustrated in FIG. 3 may be replaced by other appropriate reflecting means, such as fixed mirrors and the like. In addition, it will be noted that although in the presently preferred embodiment the combining prism 72 includes two mirrored surfaces 74 and 76, that the prism may be constructed such that numerous portions of one or more object images may be combined. For example, if the combining prism was provided with four reflecting surfaces, rather than the present two, which were oriented 90 degrees with respect to one another, then four individual object images could be combined. In the case of a VLSI circuit, appropriate light guiding means would be provided to project images of the integrated circuit 10, each image being rotated 90 degrees with respect to the other, onto the pyramid shaped combining prism. By selectively positioning the prism, all four corners of the integrated circuit with its associated conductive pads may then be simultaneously displayed.

Thus, an apparatus for combining two or more images of one or more objects has been disclosed. Although the present invention is particularly suited to integrated circuit lead bonding systems, it may be used in any optical system where selective portions of images are to be combined. While the present invention has been described with reference to FIGS. 1 through 5 and with emphasis on integrated circuit gang lead bonding, it should be understood that the Figures are for illustration only and should not be taken as limitations upon the invention.

It is contemplated that many changes and modifications may be made, by one of ordinary skill in the art, to the materials and arrangements of elements of the apparatus disclosed without departing from the spirit and scope of the invention.

I claim:

1. An apparatus for viewing selected portions of an object, comprising:
   light gathering means for gathering and focusing light rays from said object;
   a first light reflecting surface;
   a second light reflecting surface oriented substantially 90 degrees with respect to said first light reflecting surface;
   beamsplitting means for splitting said light rays into first and second object images, said first and second object images having different spatial orientations such that said second object image is inverted with respect to said first object image;
   light directing means for selectively directing at least some portion of said first object image onto said first reflecting surface, and for directing at least some portion of said second object image onto said second reflecting surface, such that said first and second object images reflected from said surfaces form a single resultant image;
   positioning means for selectively positioning said first and second surfaces along an axis defined by the bisector of said 90 degree angle between said surfaces, such that only a desired portion of said first and second object images is directed onto said reflecting surfaces;
   viewing means positioned above said first and second light reflecting surfaces for viewing said resultant image;
   whereby selected portions of said object image are combined to form a single resultant image.

2. The apparatus as defined by claim 1, wherein said first and second light reflecting surfaces comprise surfaces of a prism.

3. The apparatus as defined by claim 2, wherein said object images are directed onto said respective light reflecting surfaces at generally a 45 degree angle relative to the normal of each surface.

4. The apparatus as defined by claim 3, further including:
   beamsplitting means for splitting said first object image;
   additional viewing means for viewing said first object image.

5. An apparatus for combining images of a first and second object, comprising:
   first light gathering means for providing an image of said first object;
   second light gathering means for providing an image of said second object;
   a first light reflecting surface;
   a second light reflecting surface;
   said first and second light reflecting surfaces being oriented substantially 90 degrees with respect to one another;
   light directing means for selectively directing at least some portion of said first object image onto said first light reflecting surface, and for directing at least some portion of said second object image onto said second light reflecting surface, such that said first and second object images reflected from said surfaces form a single resultant image;
   positioning means for selectively positioning said first and second surfaces along an axis defined by the bisector of said 90 degree angle between said surfaces, such that only a desired portion of said first and second object images is directed onto reflecting said surfaces;

viewing means positioned above said first and second light reflecting surfaces for viewing said resultant image;

whereby selected portions of said first and second object images are combined to form a single resultant image.

6. The apparatus as defined by claim 5, wherein said first and second light reflecting surfaces comprise surfaces of a prism.

7. The apparatus as defined by claim 6, wherein said first and second object images are directed onto said respective light reflecting surfaces at generally a 45 degree angle relative to the normal of each surface.

8. An apparatus for viewing selected portions of an object, comprising:

light gathering means for gathering and focusing light rays from said object;

a prism including a first light reflecting surface, and a second light reflecting surface oriented substantially 90 degrees with respect to said first light reflecting surface;

first beamsplitting means for splitting said light rays into first and second object images, said first and second object images having different spatial orientations, such that said second object image is inverted with respect to said first object image;

light directing means for selectively directing at least some portion of said first object image onto said first reflecting surface, and for directing at least some portion of said second object image onto said second reflecting surface, such that said first and second object images reflected from said surfaces form a single resultant image, said object images being directed onto said respective light reflecting surfaces at generally a 45 degree angle relative to the normal of each surface;

positioning means for selectively positioning said prism along an axis defined by the bisector of said 90 degree angle between said first and second surfaces, such that only a desired portion of said first and second object images is directed onto said surfaces;

second beamsplitting means for splitting said first object image;

first viewing means positioned above said prism for viewing said resultant image, and second viewing means in optical alignment with said second beamsplitter for viewing said first object image;

whereby selected portions of said object image are combined to form a single resultant image.

* * * * *

UNITED STATES PATENT AND TRADEMARK OFFICE
CERTIFICATE OF CORRECTION

PATENT NO. : 4,439,010

DATED : Mar. 27, 1984

INVENTOR(S) : Doty

It is certified that error appears in the above-identified patent and that said Letters Patent is hereby corrected as shown below:

COLUMN     LINE 1     43     Between the words "permit" and "lead" please insert the word --proper--.

Signed and Sealed this

Third Day of March, 1987

Attest:

DONALD J. QUIGG

*Attesting Officer*     *Commissioner of Patents and Trademarks*